June 27, 1967     C. L. WILSON     3,328,019
LEVELING DEVICE FOR VEHICLES
Filed Oct. 20, 1965
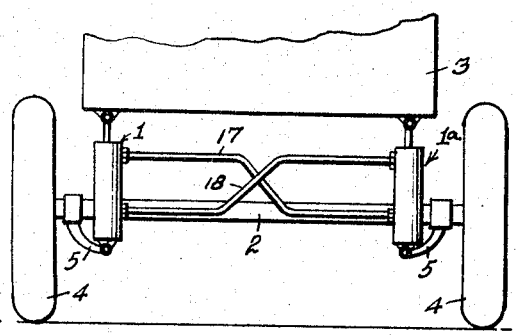
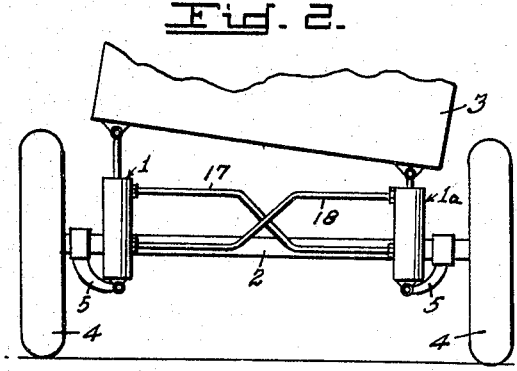
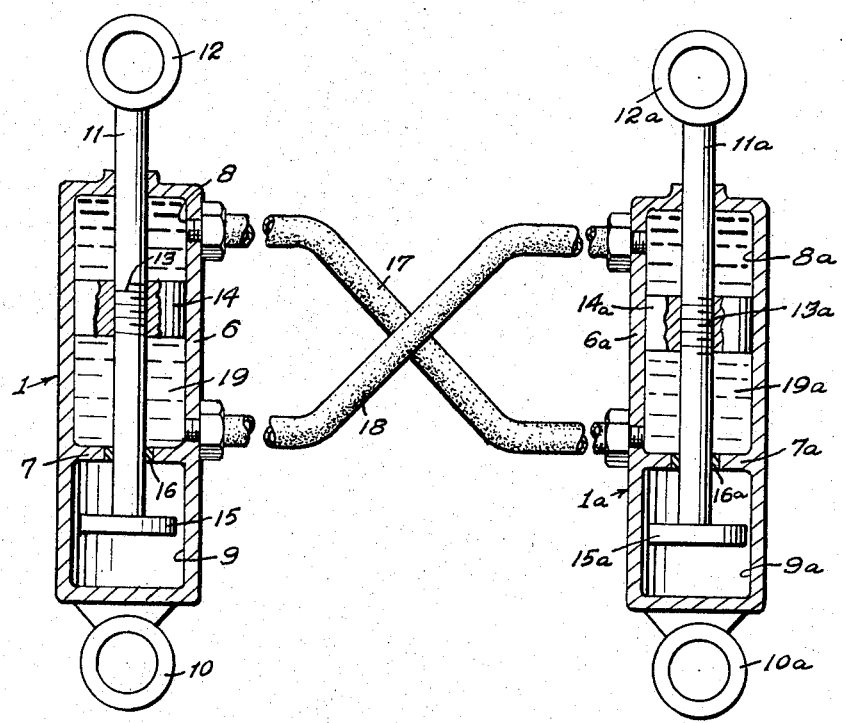
INVENTOR
*Curtis L. Wilson*
BY: *Harry M. Saragovitz,*
*Edward J. Kelly &*
*A. J. Dupont*
                   ATTORNEYS.

United States Patent Office 3,328,019
Patented June 27, 1967

3,328,019
LEVELING DEVICE FOR VEHICLES
Curtis L. Wilson, P.O. Box 1094,
Sierra Vista, Ariz. 85635
Filed Oct. 20, 1965, Ser. No. 499,108
1 Claim. (Cl. 267—11)

ABSTRACT OF THE DISCLOSURE

A leveling device for vehicles consisting of cross-coupled hydraulic cylinders having pistons therein connected to the vehicle's body. Each cylinder and piston compensates sway or dive and each piston is provided with dampening means on its end to act as a shock absorber.

---

The invention described herein may be manufactured and used by or for the Government for governmental purposes, without the payment to me of any royalty thereon.

This invention relates to a leveling device for vehicles and more particularly to a hydraulic means for preventing dive and sway in vehicles automatically and to replace the mechanical anti-dive or anti-sway bars and also the shock absorbers usually provided on road vehicles. Anti-dive and sway bars presently used in vehicles require frequent time-consuming overhauling, greasing and replacement, not to mention the cost of such operations and further adding to the weight of the vehicle.

The present invention is designed to overcome these disadvantages by a device which operates by hydraulic fluid and is automatic and eliminates all mechanical sway bars and even shock absorbers.

Briefly, the present invention consists of cross-coupled hydraulic cylinders having pistons therein connected to the vehicle's body. Each cylinder and piston compensates for the body sway or dive and each piston has a dampening means on its end to act as a shock absorber.

It is a primary object of this invention to provide a hydraulic means for the elimination of mechanical anti-dive or sway bars in a vehicle.

It is another object to provide a series of cross-coupled hydraulic cylinder and piston assemblies to compensate for dive and sway in a vehicle.

It is a further object to provide a combined self-leveling device and shock absorber for a vehicle.

A still further object is to provide a series of cross-coupled hydraulic cylinder and piston assemblies that may be used on the front and back for the prevention of body dive and also for the prevention of body sway of a vehicle.

A final object is to provide a leveling device for a vehicle having long life and requiring only simple maintenance.

These and other objects and advantages of the present invention will be fully apparent from the following description when taken in connection with the annexed drawing, in which:

FIG. 1 is a view of one end of a vehicle and showing the leveling device of the invention in elevation, the vehicle body being level;

FIG. 2 is a similar view showing the body of the vehicle tilted to the right; and, FIG. 3 is an axial schematic section taken through a pair of hydraulic cylinder and piston assemblies forming the invention.

Referring in detail to the drawings in which like reference characters indicate like parts throughout the several views therein, reference character 1 indicates the cylinder and piston assembly of the invention.

Units 1 and 1a are shown as attached to an axle 2 of a vehicle having a body 3 and wheels 4. Brackets 5 support the units 1 on axle 2.

Both units are identical and each consists of a cylinder 6 closed at each end thereof.

Cylinder 6 is divided by a partition 7 which provides chambers 8 and 9. Eyes 10 and 10a are integral with the bottom end of the respective cylinders 1 and 1a for pivotal attachment to brackets 5 as seen in FIGS. 1 and 2.

Piston rods 11, 11a are slidable in cylinders 1 and 1a and are provided with eyes 12 and 12a for pivotal attachment to body 3 of the vehicle. Piston rods 11, 11a are further provided with threaded portions 13, 13a for threadable attachment of pistons 14, 14a thereto. Pistons 14, 14a slide in chambers 8, 8a.

Second pistons 15, 15a are carried by the lower ends of piston rods 11, 11a and are of smaller diameter than the inner diameter of cylinders 6, 6a.

Gaskets 16, 16a may be mounted in partitions 7, 7a between piston rods 11, 11a for sealing between chambers 8, 8a and 9, 9a.

Cylinder and piston units 1 and 1a are cross-connected by conduits 17 and 18 as shown. Conduit 17 is connected to chamber 8 above piston 14 and to chamber 8a below piston 14a, while conduit 18 connects chamber 8 below piston 14 to chamber 8a above piston 14a.

While only one pair of cylinder and piston units are shown mounted on one end of a vehicle, another pair may be mounted at the other end so that there will be four units in all.

Cylinders 6 and 6a, or any other set, not shown, are filled with hydraulic fluid, indicated by 19 in cylinder 6 and 19a in cylinder 6a.

As shown in FIGS. 1 and 2, the system is intended to compensate for body sway. When another pair of cylinder and piston units are mounted on the other end of the vehicle, the left front cylinder will be connected to the left rear cylinder in the manner shown in FIG. 3. Likewise on the right side. This will take care of the dive or dipping of the body of the vehicle due to sudden stops, rough roads, etc.

When any force is applied to one cylinder as shown in FIG. 2, the same movement is imparted to the other to return body 3 to a level position. Hence, both sway and dive may be compensated.

Since the device is also intended to eliminate shock absorbers, pistons 15, 15a being of less diameter than the diameter of the inside of cylinders 6, 6a, a slowing action is imparted to pistons 14, 14a thereby providing a shock-absorbing dashpot action. Chambers 9 and 9a may be filled with a denser hydraulic fluid if a stiffer action of piston 14 is desired. Chambers 9, 9a are hermetically sealed from chambers 8, 8a by gaskets 16, 16a.

Hence, the device will compensate both for vehicle body sway (side to side), dive (dipping downward), and also act as a shock absorber.

The device affords less weight to a vehicle, by eliminating sway bars and shock absorbers, as well as their complications of greasing and replacement. It is especially advantageous to military vehicles that must travel along rough terrain.

Its longer life will provide trouble free service for a longer period than mechanical sway bars or shock absorbers.

While only a preferred form of the invention is shown and described, other forms of the invention are contemplated and numerous changes and modifications may be made therein without departing from the spirit of the invention as set forth in the appended claim.

What is claimed is:

A leveling device for a vehicle including a body and an axle, first and second spaced, hydraulic units for the suspension of said body on said axle, each unit comprising a cylinder pivotally mounted at its lower end to said axle and having upper and lower chambers therein, said upper chambers being adapted to be filled with a hydraulic liquid and said lower chambers being adapted to be filled with a fluid, a piston rod pivotally mounted at its upper end to said body, its other end extending axially through said upper and lower chambers, a first piston carried by said piston rod and slidable in said upper chamber, means for cross connecting said first and second units on opposite sides of said first piston therein whereby when a force is applied to the first piston in one unit, the exact movement will be imparted to the first piston in the other unit in an opposite direction, and a second piston carried by the lower end of each said piston rod and slidable in said lower chamber of said cylinder, said piston having a diameter somewhat less than the inside diameter of said cylinder, whereby the movement of said first pistons is dampened.

References Cited

UNITED STATES PATENTS

| | | |
|---|---|---|
| 1,647,518 | 11/1927 | Hawley. |
| 2,779,587 | 1/1957 | Thomas. |
| 3,188,072 | 6/1965 | Wustenhagen _____ 267—65 |

FOREIGN PATENTS 1,176,693   8/1964   Germany.

LEO FRIAGLIA, *Primary Examiner.*

PHILIP GOODMAN, *Examiner.*